United States Patent
Kanda

(10) Patent No.: US 9,376,598 B2
(45) Date of Patent: Jun. 28, 2016

(54) EASY-TO-STICK ADHESIVE SHEET

(75) Inventor: Toshimitsu Kanda, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 866 days.

(21) Appl. No.: 12/922,991

(22) PCT Filed: Mar. 17, 2009

(86) PCT No.: PCT/JP2009/055148
§ 371 (c)(1),
(2), (4) Date: Sep. 16, 2010

(87) PCT Pub. No.: WO2009/116522
PCT Pub. Date: Sep. 24, 2009

(65) Prior Publication Data
US 2011/0014462 A1    Jan. 20, 2011

(30) Foreign Application Priority Data

Mar. 18, 2008    (JP) .................................. 2008-070119

(51) Int. Cl.
*B32B 7/12*  (2006.01)
*C09J 7/02*  (2006.01)
(Continued)

(52) U.S. Cl.
CPC ............ *C09J 7/0207* (2013.01); *C09J 2201/28* (2013.01); *G09F 21/00* (2013.01); *G09F 21/04* (2013.01); *G09F 21/048* (2013.01); *Y10T 428/28* (2015.01)

(58) Field of Classification Search
CPC ..... C09J 7/0207; C09J 2201/28; G09F 21/04; G09F 21/048; G09F 21/00; Y10T 428/28
USPC ........................................ 428/42.1, 120, 343
See application file for complete search history.

(56) References Cited

U.S. PATENT DOCUMENTS

| 5,897,930 A | 4/1999 | Calhoun et al. |
| 6,524,675 B1 | 2/2003 | Mikami et al. |

(Continued)

FOREIGN PATENT DOCUMENTS

| EP | 0 279 579 A1 | 8/1988 |
| JP | 53016057 | * 2/1978 |

(Continued)

OTHER PUBLICATIONS

English Translation of Japanese Document JP S53-016057 (U), published Apr. 9, 2010 in the record of co-pending U.S. Appl. No. 12/734,074.*

(Continued)

*Primary Examiner* — Nicholas Kokkinos
(74) *Attorney, Agent, or Firm* — Oblon, McClelland, Maier & Neustadt, L.L.P

(57) ABSTRACT

The easily applicable adhesive sheet of the invention is characterized by having a base sheet, and an adhesive layer which is provided on the base sheet and which has, in a surface portion, a plurality of air passages having grooves opening on an end edge portion of the base sheet, wherein each air passage includes therein numerous island-like protrusions whose tops are flush with the surface of the adhesive layer, and the island-like protrusions are arranged such that any circle inscribed in the grooves defined by side walls of the air passage and those of the protrusions has a diameter of 5 to 90 μm at the level of the surface of the adhesive layer. The invention provides an easily applicable adhesive sheet which is smoothly applied to an adherend without formation of "blisters," and which exhibits excellent appearance after application to the adherend.

8 Claims, 2 Drawing Sheets

(51) Int. Cl.
    *G09F 21/00*     (2006.01)
    *G09F 21/04*     (2006.01)

(56) References Cited

U.S. PATENT DOCUMENTS

| | | |
|---|---|---|
| 2003/0178124 A1 | 9/2003 | Mikami et al. |
| 2004/0224129 A1 | 11/2004 | Sakurai et al. |
| 2006/0188704 A1 | 8/2006 | Mikami et al. |
| 2007/0039271 A1 | 2/2007 | Fleming et al. |
| 2008/0105356 A1 | 5/2008 | Mikami et al. |

FOREIGN PATENT DOCUMENTS

| | | |
|---|---|---|
| JP | 2001 507641 | 6/2001 |
| JP | 2002 544364 | 12/2002 |
| WO | 03 025078 | 3/2003 |
| WO | 2009 020003 | 2/2009 |
| WO | 2009 048176 | 4/2009 |

OTHER PUBLICATIONS

U.S. Appl. No. 12/671,771, filed Feb. 2, 2010, Kanda.
Extended European Search Report issued Mar. 26, 2013 in Patent Application No. 09721380.5.

* cited by examiner

EASY-TO-STICK ADHESIVE SHEET

TECHNICAL FIELD

The present invention relates to an adhesive sheet which can be easily applied to an adherend so as to attain desired quality of adhesion (hereinafter the adhesive sheet may be referred to as an "easily applicable adhesive sheet"). More particularly, the present invention relates to an easily applicable adhesive sheet which, when applied to an adherend, causes air bubbles to be less likely to form between the adhesive sheet and the adherend (i.e., which can be easily applied to the adherend) and is not impaired in appearance, and which is particularly useful as a large-sized adhesive sheet.

BACKGROUND ART

In general, an adhesive sheet includes a base sheet; an adhesive layer formed on a surface of the base sheet; and a release sheet which is optionally provided on the adhesive layer. In use of such an adhesive sheet, when the adhesive sheet includes a release sheet, the release sheet is removed therefrom, and the adhesive sheet is applied to an adherend by bringing the adhesive layer into contact with the adherend.

However, in the case of use of an adhesive sheet having a somewhat large area (e.g., an adhesive sheet for sign or decoration, an adhesive sheet for coating or masking, or an adhesive sheet for protecting the surface of a metal plate or the like), the adhesive sheet poses a problem in that air bubbles are likely to be formed between the adhesive layer and an adherend, and the thus-formed air bubbles become "blisters"; i.e., the adhesive sheet is difficult to apply smoothly to the adherend.

In order to solve such a problem, attempts have been made to provide an adhesive sheet including an adhesive layer having air passages in a surface portion thereof, so that when the adhesive sheet is applied to an adherend, formation of air bubbles is prevented by releasing air through the flow passages (see, for example, Patent Document 1). For example, there have been proposed an adhesive sheet in which the arrangement (or arrangement pattern) of air passages (grooves) is defined such that a groove is necessarily present in any circular region having a diameter of 500 μm; i.e., the distance between adjacent grooves is small (Patent Document 2); and an easily applicable adhesive sheet in which grooves are provided in a lattice pattern so as to extend obliquely with respect to the direction of application of the adhesive sheet (Patent Document 3).

However, generally, such an adhesive sheet poses a problem in that when grooves (i.e., air passages) have a small width, air is difficult to release therethrough, whereas when the grooves have a large width, the adhesive sheet exhibits poor appearance due to formation of dents on the surface of the base sheet. Particularly, when the distance between adjacent grooves is increased for achieving sufficient adhesion, since the width of the grooves must be increased, the adhesive sheet exhibits poor appearance due to formation of dents on the surface of the base sheet.
Patent Document 1: Japanese Patent Application Laid-Open (kokai) No. S63-223081
Patent Document 2: Japanese Kohyo Patent Publication No. 2002-544364
Patent Document 3: WO 03/025078 pamphlet

DISCLOSURE OF THE INVENTION

Problems to be Solved by the Invention

In view of the foregoing, an adherend of the present invention is to provide an easily applicable adhesive sheet which is smoothly applied to an adherend without formation of "blisters" (i.e., even when air bubbles are formed between the adhesive sheet and the adherend upon application thereof, air is easily released), and which exhibits excellent appearance after application thereof to the adherend.

Means for Solving the Problems

The present inventor has conducted extensive studies for developing such an easily applicable adhesive sheet, and as a result has found that the aforementioned adherend can be achieved by providing an adhesive layer having an air passage including therein numerous island-like protrusions whose tops are flush with a surface of the adhesive layer and which are arranged in a specific pattern (i.e., arranged such that grooves provided in the air passage have, at the level of the surface of the adhesive layer, an opening size falling within a specific range). The present invention has been accomplished on the basis of this finding.

Accordingly, the present invention provides:

(1) an easily applicable adhesive sheet characterized by comprising a base sheet, and an adhesive layer which is provided on the base sheet and which has, in a surface portion thereof, a plurality of air passages having grooves opening on an end edge portion of the base sheet, wherein each air passage includes therein numerous island-like protrusions whose tops are flush with the surface of the adhesive layer, and the island-like protrusions are arranged such that any circle inscribed in the grooves defined by side walls of the air passage and those of the protrusions has a diameter of 5 to 90 μm at the level of the surface of the adhesive layer;

(2) an easily applicable adhesive sheet according to (1) above, wherein each air passage has a width of 50 to 3,000 μm, and the distance between adjacent air passages is 200 to 3,000 μm;

(3) an easily applicable adhesive sheet according to (1) above, wherein the air passages are arranged in a lattice pattern such that they intersect at an angle of 40 to 140°;

(4) an easily applicable adhesive sheet according to (1) above, wherein the top of each island-like protrusion has a square, rectangular, or circular shape;

(5) an easily applicable adhesive sheet according to (1) above, wherein each island-like protrusion has a square, rectangular, trapezoidal, or inverted U-shaped cross section;

(6) an easily applicable adhesive sheet according to (1) above, wherein each groove has a depth of 5 to 50 μm; and (7) an easily applicable adhesive sheet according to (1) above, wherein the adhesive layer has a thickness of 7 to 100 μm.

Effects of the Invention

In the adhesive sheet of the present invention, each air passage includes therein numerous island-like protrusions. Therefore, even when the air passage has a large width, the adhesive sheet can be applied to an adherend without forming dents on the base sheet. Since grooves provided at both ends of each air passage and opening to the outside communicate with grooves provided between island-like protrusions, grooves through which air flows are widened substantially, thereby facilitating air release. A limitation imposed on the opening size of grooves at the level of the surface of the adhesive layer, which is determined by arrangement of the island-like protrusions, secures easy release of air and reliably prevents formation of dents on the base sheet.

Therefore, even in the case where air bubbles are formed between the adhesive sheet and an adherend upon application of the adhesive sheet, when the air bubbles are pressed with, for example, a squeegee, air is released from the air bubbles through any of communicating grooves of an air passage (in a pressing direction) to the outside via opening ends of the air passage, whereby the air bubbles are eliminated, and "blisters" are not formed. Since the opening size of grooves is not large at the level of the surface of the adhesive layer, no dents are formed on the base sheet after elimination of the air bubbles, and the thus-applied adhesive sheet exhibits excellent appearance.

Thus, according to the present invention, the adhesive sheet is smoothly applied to an adherend without formation of "blisters" (i.e., even when air bubbles are formed between the adhesive sheet and the adherend upon application thereof, air is easily released), and the thus-applied adhesive sheet is not impaired in appearance.

The adhesive sheet of the present invention is particularly suitable as a large-sized adhesive sheet for decoration of, for example, a signboard, a wall, or a vehicle.

DESCRIPTION OF REFERENCE NUMERALS

Figure 1:
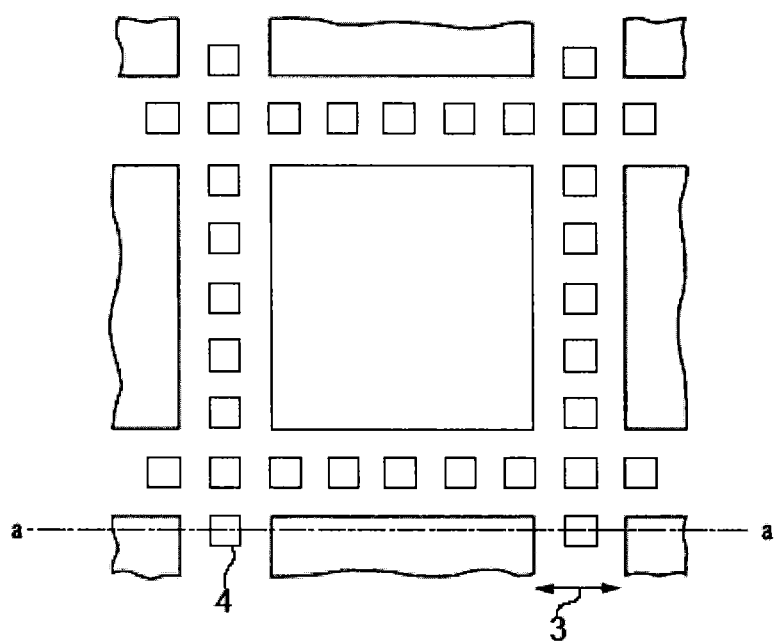
FIG. 1 is a plan view of an adhesive sheet according to an embodiment of the present invention as viewed on the side of an adhesive layer.

1. Base sheet
2. Adhesive layer
3. Air passage
4. Island-like protrusion
A. Width of air passage
B. Distance between adjacent air passages
C. Depth of groove
D. Thickness of adhesive layer
S. Smallest circle inscribed in groove
L. Largest circle inscribed in groove

BEST MODES FOR CARRYING OUT THE INVENTION

The adhesive sheet of the present invention includes a base sheet, and an adhesive layer which is formed on a surface of the base sheet and includes air passages having a specific structure. No particular limitation is imposed on the base sheet, and the base sheet may be any one appropriately selected from among base sheets conventionally used for adhesive sheets.

Examples of the base sheet include papers such as wood free paper, glassine paper, and coated paper; sheets of plastics such as polyesters (e.g., polyethylene terephthalate and polyethylene naphthalate), polyolefins (e.g., polypropylene and polyethylene), polyvinyl chloride, polyvinylidene chloride, polystyrene, polycarbonate, polyvinyl alcohol, polyurethane, and acrylic resin; synthetic papers made from such resins; and sheets of cellulose materials such as cellulose triacetate, cellulose diacetate, and cellophane. The thickness of the base sheet may be appropriately determined in consideration of the intended use or usage of the adhesive sheet, and is generally 10 to 300 μm, preferably 30 to 150 μm.

When the base sheet employed is a plastic sheet, the base sheet may optionally be subjected to a treatment for forming surface irregularities (e.g., sandblast or treatment with a solvent), an oxidation treatment (e.g., corona discharge, irradiation with ozone or UV rays, flame treatment, chromic acid treatment, or hot-air treatment), or other treatments, for the purpose of improving adhesion between the base sheet and the adhesive layer provided thereon.

No particular limitation is imposed on the adhesive for forming the adhesive layer provided on a surface of the aforementioned base sheet, and the adhesive employed may be an adhesive which has been conventionally used for forming an adhesive layer of an adhesive sheet, such as an acrylic adhesive, a rubber adhesive, or a silicone adhesive.

The adhesive sheet of the present invention has a structure in which an adhesive layer provided on the aforementioned base sheet has, in a surface portion thereof, air passages having grooves opening on an end edge portion of the base sheet, and each air passage includes therein numerous island-like protrusions whose tops are flush with the surface of the adhesive layer.

Figure 2:
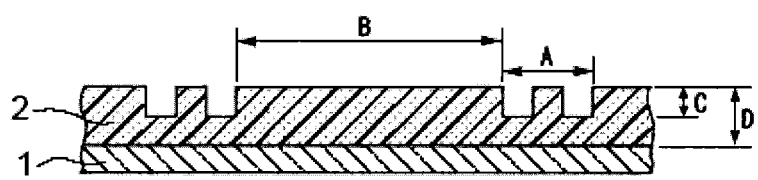
FIG. 2 is a cross-sectional view of the adhesive sheet of FIG. 1, as taken along line a-a.

FIG. 1 is a plan view of an adhesive sheet according to an embodiment of the present invention as viewed on the side of an adhesive layer, and FIG. 2 is a cross-sectional view of the adhesive sheet of FIG. 1, as taken along line a-a.

In each air passage, island-like protrusions must be arranged such that any circle inscribed in the grooves defined by side walls of the air passage and those of the protrusions has a diameter of 5 to 90 μm at the level of the surface of the adhesive layer.

As used herein, "grooves defined by side walls of an air passage and those of island-like protrusions" refers to all spaces (grooves) defined by side walls of the air passage and those of the island-like protrusions, including a space provided between a side wall of the air passage and a facing side wall of any of the island-like protrusions, a space provided between facing side walls of adjacent island-like protrusions, and a space provided between a side wall of the air passage and corners of adjacent island-like protrusions. As used herein, "any circle inscribed in the grooves defined by side walls of the air passage and those of the protrusions has a diameter of 5 to 90 μm at the level of the surface of the adhesive layer" refers to the case where, in any of the grooves, a circle inscribed, at the level of the surface of the adhesive layer (on the side where the grooves are open), in the side walls of the corresponding air passage or island-like protrusions has a diameter of 5 to 90 μm. That is, the island-like protrusions are arranged such that the largest one of all the circles inscribed in the thus-defined grooves has a diameter of 90 μm or less, and the smallest one of all the circles inscribed therein has a diameter of 5 μm or more.

Figure 3:
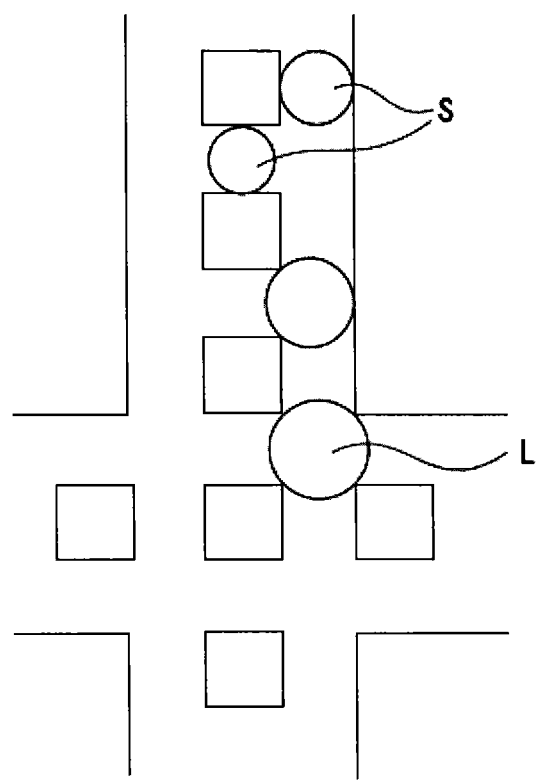
FIG. 3 is an enlarged view of a portion of air passages of the adhesive sheet of FIG. 1.

FIG. 3 is an enlarged view of a portion of air passages of the adhesive sheet of FIG. 1, which shows the smallest circle S and the largest circle L inscribed, at the level of the surface of the adhesive layer, in grooves defined by side walls of the air passages and those of island-like protrusions.

In the case where such an inscribed circle has a diameter of less than 5 μm, when air bubbles are squeegeed after application of the adhesive sheet to an adherend, air is less likely to be released. In contrast, in the case where such an inscribed circle has a diameter of more than 90 μm, a problem arises in that dents may be formed on the surface of the base sheet after application of the adhesive sheet to an adherend. From this viewpoint, the diameter of such an inscribed circle is more preferably 10 to 60 μm.

No particular limitation is imposed on the island-like protrusions, so long as they are arranged in air passages as described above. In each air passage, the distance between a side wall of the air passage and a side wall of an island-like protrusion that face each other may be uniform or may vary, and similarly, the distance between the facing side walls of adjacent island-like protrusions may be uniform or may vary.

In each air passage, island-like protrusions may be arranged in a single line or a plurality of lines.

However, preferably, protrusion units, each including some island-like protrusions, are at least arranged in a repeated pattern, from the viewpoint of facilitation of industrial production of the adhesive sheet.

The shape (as viewed from above) of the top of each island-like protrusion is preferably, for example, a square, rectangular, or circular shape.

Each island-like protrusion preferably has, for example, a square, rectangular, trapezoidal, or inverted U-shaped cross section.

The cross-sectional shape of grooves defined by side walls of air passages and those of island-like protrusions may vary with the cross-sectional shape or arrangement of the protrusions. However, generally, each grove portion preferably has, for example, a square, rectangular, inverted trapezoidal, V-shaped, or U-shaped cross section.

Each groove preferably has a depth of 5 to 50 μm, more preferably 5 to 25 μm.

Each air passage preferably has a width of 50 to 3,000 μm, preferably 50 to 1,000 μm.

The distance between adjacent air passages is preferably 200 to 3,000 μm, more preferably 500 to 2,000 μm.

Air passages provided in the adhesive layer surface are preferably arranged in a regular pattern (e.g., stripe pattern or lattice pattern), particularly preferably in a lattice pattern.

The air passages arranged in a lattice pattern may have the same pitch or different pitches in two crossing directions. However, preferably, the air passages have the same pitch or approximate pitches, from the viewpoint of taking no account of the direction of squeegeeing for release of air.

Preferably, the air passages arranged in a lattice pattern and extending in two crossing directions intersect at an angle of 40 to 140°.

The adhesive layer preferably has a thickness of 7 to 100 μm, more preferably 7 to 50 μm.

No particular limitation is imposed on the method for producing the adhesive sheet of the present invention, so long as the method can form, on a surface of a base sheet, an adhesive layer having air passages each including island-like protrusions having the aforementioned arrangement and shape. For example, any of the following methods may be employed: (1) a method in which a flat adhesive layer is provided directly on a surface of a base sheet, and subsequently the adhesive layer is brought into contact with an embossing roll, to thereby form air passages each including island-like protrusions; and (2) a method in which an adhesive is applied to a releasably treated layer of a release sheet having an embossment corresponding to the shape of air passages, and a base sheet is applied to the resultant adhesive layer. Of these methods, method (2) (i.e., transfer method) is preferably employed, from the viewpoint of, for example, operability.

Through such a transfer method, an adhesive sheet of interest can be produced by forming an adhesive layer on a releasably treated layer of a release sheet, the releasably treated layer having a pattern transfer surface, and subsequently applying a base sheet to the adhesive layer. The release sheet including a releasably treated layer having a pattern transfer surface may be produced through, for example, the following procedure: a polyethylene resin or the like is thermally melted and applied to a release sheet base; a release agent (e.g., silicone resin) is applied to the base to thereby form a releasably treated layer; and the releasably treated layer is subjected to patterning through a known process. Through transfer of the pattern on the releasably treated layer, there can be formed an adhesive layer having air passages each including island-like protrusions having the aforementioned arrangement and shape. No particular limitation is imposed on the release sheet base employed, and the release sheet base may be any one selected from among conventionally used release sheet bases. Examples of such a release sheet base include papers such as glassine paper, coated paper, and laminated paper; and various plastic films.

When the easily applicable adhesive sheet of the present invention is produced through the aforementioned transfer method (i.e., when the adhesive sheet is provided with a release sheet), upon use of the adhesive sheet, the release sheet is removed therefrom, and the adhesive sheet is applied to an adherend by abutting the adhesive layer to the adherend. In the case where air bubbles are formed between the adhesive sheet and the adherend, when the air bubbles are pressed out with a squeegee, air is released from the air bubbles through communicating grooves of an air passage in a pressing direction, and the air bubbles are eliminated. Therefore, the adhesive sheet can be smoothly applied to the adherend without formation of "blisters." The thus-applied adhesive sheet is not impaired in appearance, since dents, etc. are not formed on the surface of the base sheet, and the structure of grooves does not stand out.

EXAMPLES

The present invention will next be described in more detail by way of examples, which should not be construed as limiting the invention thereto.

Production Example 1

A butyl acrylate monomer (90 parts by weight) and an acrylic acid monomer (10 parts by weight) were added to a reactor equipped with a thermometer, a stirrer, a reflux condenser, and a nitrogen gas inlet tube, and azobisisobutyronitrile (0.3 parts by weight) was added thereto, followed by polymerization in a nitrogen gas atmosphere at 80° C. for eight hours. After completion of reaction, the solid content of the reaction mixture was adjusted to 34% with toluene, to thereby produce a solution of an acrylic copolymer having a weight average molecular weight of 500,000. An isocyanate cross-linking agent (BHS 8515, product of Toyo Ink Mfg. Co., Ltd.) (2 parts by weight) was added to the copolymer solution (100 parts by weight), to thereby produce an adhesive solution.

Examples 1 to 3 and Comparative Examples 1 and 2

A polyethylene layer (thickness: 30 μm) and a silicone layer (thickness: 0.1 μm) were sequentially provided on a wood free paper sheet (100 g/m²), to thereby prepare a release sheet. The release sheet was thermally pressed with a metallic roll having an embossment corresponding to air passages arranged in a lattice pattern, each passage including island-like protrusions having dimensions and an arrangement shown in Table 1, to thereby produce a release sheet including a releasably treated layer having a pattern transfer surface.

The adhesive solution produced in Production Example 1 was applied to the above-produced release sheet, and the solvent was dried. Subsequently, a vinyl chloride sheet (thickness: 50 μm) was applied to the resultant adhesive layer, to thereby produce an adhesive sheet including the adhesive layer having, in a surface portion thereof, air passages arranged in a lattice pattern, each passage including island-like protrusions having dimensions and an arrangement shown in Table 1 (the diameters of the largest and smallest circles inscribed in grooves).

The air passages, each having a width of 200 μm, are arranged in an orthogonal lattice pattern. Island-like protrusions whose tops have the same size and a square shape are centrally arranged in each air passage in a single line at regular intervals. A groove provided between a side wall of an air passage and a facing side wall of an island-like protrusion, or between facing side walls of adjacent island-like protrusions has a rectangular cross section, and a depth of 15 μm.

The thus-produced adhesive sheet was subjected to the following tests. The results are shown in Table 1.

(1) "Air Bubble Elimination Test"

The adhesive sheet was cut into test pieces each having a size of 50 mm×50 mm. A test piece was applied to a melamine coated plate so that a circular air bubble (diameter: about 15 mm) was formed. Subsequently, the air bubble was pressed out with a squeegee, and then whether or not the air bubble was eliminated was determined. When the air bubble was easily eliminated, rating "AA" was assigned; when the air bubble was eliminated, rating "BB" was assigned; and when the air bubble was not eliminated and a "blister" was formed, rating "CC" was assigned.

(2) "Appearance Test"

The test piece which had undergone the aforementioned air bubble elimination test was visually observed. When the air passages were not visually recognized as surface irregularities of the base sheet, rating "A" was assigned; when the air passages were somewhat visually recognized as surface irregularities of the base sheet, rating "B" was assigned; and when the air passages were visually recognized as surface irregularities of the base sheet, rating "C" was assigned.

INDUSTRIAL APPLICABILITY

According to the present invention, there can be provided an easily applicable adhesive sheet which is smoothly applied to an adherend without formation of "blisters" (i.e., even when air bubbles are formed between the adhesive sheet and the adherend upon application thereof, air is easily released), and which exhibits excellent appearance after application thereof to the adherend.

The adhesive sheet of the present invention is particularly suitable as a large-sized adhesive sheet for decoration of, for example, a signboard, a wall, or a vehicle.

The invention claimed is:

1. An adhesive sheet comprising a base sheet and an adhesive layer provided on the base sheet, wherein said adhesive layer comprises in a surface portion thereof a plurality of air passages each having a width of 50 to 3,000 μm and arranged such that a distance between adjacent air passages is 500-600 μm, said air passages having grooves opening on an end edge portion of the base sheet, each air passage comprising therein a plurality of protrusions surrounded by grooves defined by side walls of the air passage and side walls of the protrusions, wherein the protrusions have tops which are flush with the surface of the adhesive layer and are arranged such that the smallest circle inscribed in the grooves defined by the side walls of the air passage and the side walls of the protrusions has a diameter of 10 to 60 μm at the level of the surface of the adhesive, the largest circle inscribed in the grooves defined by the side walls of the air passage and the side walls of the protrusions has a diameter of 14 to 85 μm at the level of the surface of the adhesive, and the length of the side walls of the protrusions is 80-180 μm.

2. The adhesive sheet according to claim 1, wherein the air passages are arranged in a lattice pattern such that they intersect at an angle of 40 to 140°.

3. The adhesive sheet according to claim 1, wherein the top of each protrusion has a square, rectangular, or circular shape.

4. The adhesive sheet according to claim 1, wherein each protrusion has a square, rectangular, trapezoidal, or inverted U-shaped cross section.

5. The adhesive sheet according to claim 1, wherein each groove has a depth of 5 to 50 μm.

6. The adhesive sheet according to claim 1, wherein the adhesive layer has a thickness of 7 to 100 μm.

7. The adhesive sheet according to claim 1, wherein upon being applied to an adherend, the adhesive sheet shows no formation of blisters and exhibits an appearance wherein the air passages are not visually recognized as surface irregularities of the sheet.

8. The adhesive sheet according to claim 1, wherein the distance between adjacent air passages is 560-600 μm, the diameter of the smallest circle inscribed in the grooves defined by the side walls of the air passage and the side walls

TABLE 1

|  | Length of side of island-like protrusion (μm) | Distance between adjacent air passages (μm) | Diameter of the smallest circle inscribed in groove (μm) | Diameter of the largest circle inscribed in groove (μm) | Air bubble elimination test | Appearance test |
|---|---|---|---|---|---|---|
| Ex. 1 | 180 | 560 | 10 | 14 | BB | A |
| Ex. 2 | 120 | 600 | 40 | 57 | AA | A |
| Ex. 3 | 80 | 500 | 60 | 85 | AA | B |
| Comp. Ex. 1 | 60 | 580 | 70 | 99 | AA | C |
| Comp. Ex. 2 | 40 | 520 | 80 | 113 | AA | C | of the protrusions is 10 to 40 μm at the level of the surface of the adhesive, the diameter of the largest circle inscribed in the grooves defined by the side walls of the air passage and the side walls of the protrusions is 14 to 57 μm at the level of the surface of the adhesive, and the length of the side walls of the protrusions is 120-180 μm.

\* \* \* \* \*